United States Patent
Malchow

[11] 3,842,718
[45] Oct. 22, 1974

[54] BOLTED CONNECTION INCLUDING A STUD

[76] Inventor: William A. Malchow, 1385 N. Castle Rd., Sonoma, Calif. 95476

[22] Filed: Apr. 12, 1973

[21] Appl. No.: 350,334

[52] U.S. Cl.................. 92/171, 287/56, 123/193 C
[51] Int. Cl. ........................................... F16g 11/04
[58] Field of Search.................... 92/171, 169, 170; 123/193 R, 103 C, 103 CH; 287/56, 2

[56] References Cited
UNITED STATES PATENTS

| | | | |
|---|---|---|---|
| 1,592,166 | 7/1926 | Hamer | 92/171 |
| 1,801,395 | 4/1931 | Summers | 92/171 |
| 2,118,317 | 5/1938 | Mader | 92/171 |
| 2,303,309 | 11/1942 | McArthur | 287/56 |
| 2,638,081 | 5/1953 | Spannhake | 123/193 R |
| 2,736,300 | 2/1956 | Flynn, Jr. | 123/193 CH |
| 2,851,020 | 9/1958 | Dulza | 92/171 |
| 3,610,110 | 10/1971 | Schaaf | 92/171 |

Primary Examiner—Paul E. Maslousky
Attorney, Agent, or Firm—Oswald H. Milmore

[57] ABSTRACT

A bolted connection, e.g., for fastening a cylinder liner and cylinder head to an engine block, includes a long stud having threaded engagement with a hole in the block, an integral flange on the stud situated partly within a counterbore in the block hole but extending above the block surface, a flange on the cylinder liner bearing down on the stud flange, and a nut on the outer end of the stud bearing against a cylinder head which, in turn, clamps the cylinder liner to the block. A compressible gasket may be placed between the block and liner flange, overlying the stud flange.

6 Claims, 4 Drawing Figures

PATENTED OCT 22 1974　　　　　　　　　　　　　　3,842,718

BOLTED CONNECTION INCLUDING A STUD

The invention relates to a bolted connection for clamping a member to a base and includes a stud which is threadedly engaged to the base and has a nut for pressing the member against the base. It is expecially, although not exclusively, useful for fastener a cylinder liner and a cylinder or engine head to an engine block.

Difficulty has been experienced in insuring tighness of the threaded connection of hold-down studs to a base. For example, the cylinder liners and cylinder heads of some engines are clamped to the engine block by long studs (usually a plurality, such as four for each liner) which are threadedly engaged to the block. Because the threads are inclined wedges, vibrations, occurring concommitantly with tension on the studs, cause the studs to rotate relatively to the block; this causes linear motion of of the stud away from the block, loosening the stud.

This difficulty is aggravated when the base, such as the engine block, has a higher coefficient of thermal expansion than the stud and the parts become heated after assembly. The base then expands in relation to the stud, making it easier for the stud to rotate relatively to the base.

It has been proposed to prevent relative motion between the stud and the base by using special threads, e.g., non-uniform threads on the studs, or threads that become deformed when the stud is tightened. However, this solution often damages the threads on the stud and/or the base to the extent that the stud cannot be reused.

It is an object of the invention to provide a connection for clamping a member, usually a metallic member, to a base, which includes a stud having a threaded engagement to the base, wherein the stud is prevented from coming loose from the base.

A specific object is to provide an improved connection as specified in the first object wherein the stud is firmly seated to the base by means permitting elastic deformation of a flange on the stud.

Another specific object is to provide an improved bolted connection for clamping a cylinder liner and an engine head to an engine block, which includes a stud having threaded engagement with the block, which insures fastness of the connected parts.

It will be appreciated that the latter two objects are not attained in all embodiments.

In summary, the connection includes a base having a threaded hole with a counterbore, the stud has a threaded connection with the base at its hole and carries an integral flange which is situated partly within the counterbore but has a part of its outer surface situated slightly outside of the base face, the clamped member bears against the said face and includes a part which overlies the stud flange, the part of the clamped member which is remote from the base being pressed toward the base by means which includes a nut on the stud, and may include one or more additional members; a compressible gasket may optionally be placed between the base and the clamped member, overlying the stud flange.

For example, as applied to clamping a cylinder liner to an engine block, the liner may fit into a hole in the block and have an annular flange which bears against the stud flange (or, when used, against the compressible gasket), and the nut on the outer end of the stud then bears against a cylinder head which, in turn, bears against the cylinder liner.

Thereby the nut on the outer end of the stud forces the clamped member against the outer surface of the stud flange, and the stud is thereby prevented from turning relatively to the base.

Advantageously, the stud flange and the base of the counterbore are in engagement only on an annular seat (which may be but need not be continuous), as by recessing the part of the stud flange and/or of the base of the counterbore. Thereby the stud flange is subjected to a slight deformation, and/or the clamped member bears down on an area which is defined in part by the seat, and the tightness of the connection is enhanced. It is not known whether elastic deformation of the stud flange or the localized force of the clamped member urging the stud flange against the base only on a part of the seat is more important, and the invention is not to be limited to either theory of action.

The invention will be further described with reference to the accompanying drawings, which form a part of this specification, and shown one illustrative embodiment, wherein.

Figure 2:
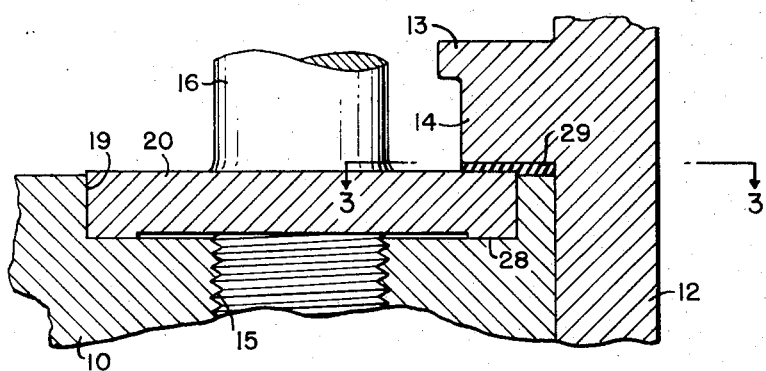
FIG. 2 is an enlarged view of a portion of FIG. 1.
Figure 3:
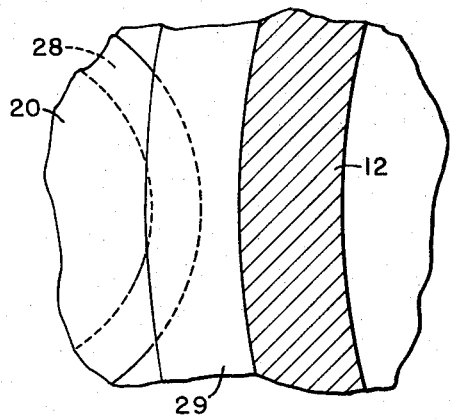
FIG. 3 is a section taken on the line 3—3 of FIG. 2.
Figure 1:
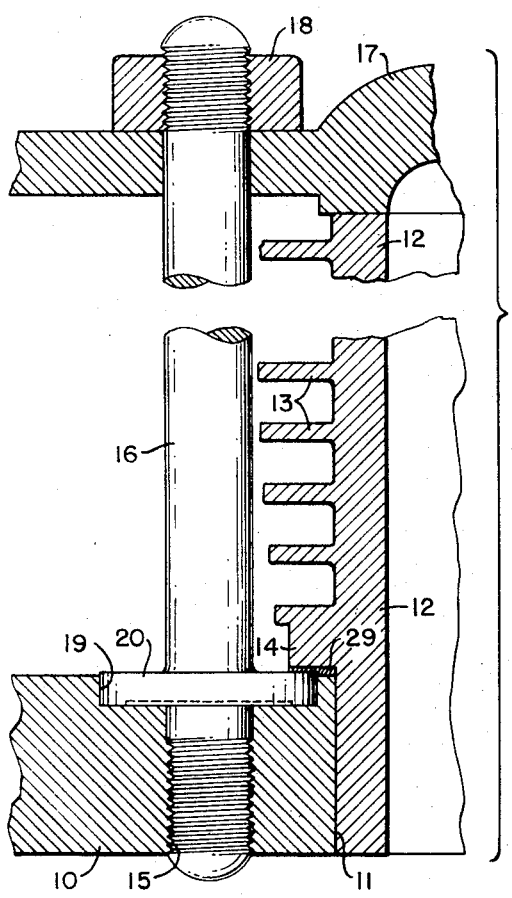
FIG. 1 is a sectional view through parts of an engine block, cylinder liner and cylinder head, held together by a stud constructed according to the invention.

Referring to FIGS. 1–3, the engine block 10 has one or more cylindrical openings 11 for receiving the lower extremities of cylinder liners, only one such liner being shown at 12. The liners have cooling fins (if the cylinders are air-cooled) indicated at 13, and each has a peripherally continuous flange 14, for bearing against the upper surfaces of the block. The block has an internally threaded hole 15 into which the lower end of a stud 16 is screwed. A cylinder head 17 engages the top surface of the liner 12 and has a hole for passage of the stud 16, which carried a nut 18. This nut is secured against rotation by friction, although a lock-washer may be interposed between it and the cylinder head.

Considering the novel parts, the hole 15 is counterbored, as shown at 19, and the stud 16 carries integrally therewith (of the same piece, or welded thereto) a stud flange 20 which is, for the greater part, contained within the counterbore but which extends at its outer surface slightly beyond the outer surface of the block 10, e.g., 0.02 to 0.2 mm. The stud flange 20 may, for example, have a thickness of 3 to 10 mm., and the depth of the counterbore is made such as to cause the above-stated protrusion of the flange 20.

Figure 4:
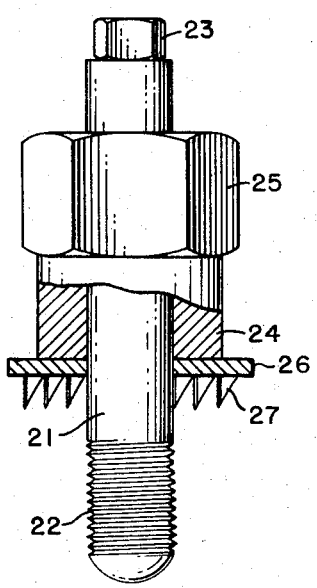
FIG. 4 is an elevation, partly in section, of a counterboring tool suitable for adapting an engine block to receive the improved stud of the invention.

To prepare the engine block 10, previously formed with the threaded hole 15, to receive the improved stud, one may use a tool as is shown in FIG. 4. This tool includes an inner guide shaft 21, having a bottom threaded portion 22 mating with the threads in the hole 15, and smoothly cylindrical above that portion. A nut 23 is fixed to the outer end of the guide shaft 21 to permit attachment to the base block. Surrounding the smooth, cylindrical portion, is an annular, relatively slidable and rotatable piece 24, having a hexagonal nut 25 fixed to its top and carrying a bore-stop flange 26 and, beneath said flange, a toothed cutter head 27. The vertical extent of the head 27 beneath the flange 26 determines the depth of the counterbore, which is cut into the block 10 by turning the annular piece 24.

The bottom of the stud flange 20 and/or the base of the counterbore 19 is preferably recessed, to provide a narrow, annular seat 28 on which the stud flange and recess base make contact, the inner limit of the seat being situated directly beneath or near, e.g., slightly inside (relatively to the stud 16) of the flange 14, as shown. Typically, this seat may have a width of 1 to 5, e.g., 2 mm., or, in terms of the radius of the stud flange, about 0.1 to 0.5 of the radius of the stud flange. The recessed portion has a depth sufficient to insure contact only at the seat despite slight elastic deformation of the stud flange, e.g., 0.06 or more mm. This preferred construction permits some elastic deflection of the stud flange and/or permits the flange 14 of the clamped member to bear down to cause smaller areas of the stud flange and counterbore seat to come into engagement under force.

It will be noted that a thin gasket 29 of compressible material is optionally placed between the flange 14 and the block 10, overlying the stud flange 20, when the clamped member 12 is to be sealed to the block. For example, when the upward protrusion of the stud flange above the block is about 0.05 mm., this gasket has a thickness of about 0.15 mm.

As shown, the gasket 29 is compressed to a greater extent where it engages the outer surfaces of the stud flanges 20 than at other regions. The downward force of the liner flange 14, through the gasket 29, against the stud flange, prevents longitudinal movement of the stud. The stud 16 is, therefore, secure although various combinations of metals are used in the connection. For example, in a specific embodiment, the stud 16 and nut 18 are of steel, the liner 12 of cast iron, the cylinder head 17 of aluminum or an alloy containing aluminum, and the engine block 10 is of a metal having a higher coefficient of thermal expansion than steel, such as, for example, one consisting predominantly of magnesium and containing aluminum and small amounts of other metals. Such a block has three or more times the coefficient of expansion of steel. Despite the relatively greater thermal expansion of the block than the stud, the stud flange 20 is pressed downwards by the liner flange 14 and the stud 16 is thereby securely fastened.

It is evident that, in attaching the stud to the base, it is screwed into the threaded hole 15 until the stud flange 20 is firmly seated against the base of the counterbore 19, to secure it frictionally against rotation. When, in the preferred construction, the radially inner part of the stud flange 20 and/or the base of the counterbore is recessed to permit abutting contact only at the outer, annular seat 28, the stud flange is elastically deformed, permitting a more secure attachment of the stud to the block. The part of the stud flange at the seat, lying directly beneath the flange 14, is firmly pressed over a small area against the base of the counterbore to prevent relative rotation of the stud and base or engine block.

I claim as my invention:

1. A connection between a base and a clamped member which comprises:
   a. a base having an internally threaded hole and a counterbore,
   b. a stud having at its inner end a stem threadedly engaged to the base within the hole, an integral flange situated principally within the counterbore and having a thickness in excess of the depth of the counterbore whereby the outer surface of said stud flange is situated out of said counterbore, and
   c. a clamped member in abutment with said base overlying said stud flange at least in part, said clamped member being urged toward the base and said stud flange by means connected to the outer end of the stud.

2. A connection according to claim 1 wherein said stud is of steel and said base is of a metal having a coefficient of thermal expansion which is greater than that of steel.

3. A connection according to claim 1 wherein said stud flange and base of the counterbore are in contact only at an annular seat at the periphery of the stud flange, the radially inner part of at least the stud flange or the counterbore base being recessed.

4. A connection according to claim 1 wherein said stud flange has a thickness which is greater than the depth of the counterbore by a distance between 0.02 and 0.2 mm.

5. A connection according to claim 1 wherein said base is a part of an internal combustion engine having formed therein a hole for receiving the clamped member, said clamped member is an engine cylinder liner, said base presents an annular seating surface surrounding said hole, said cylinder liner has a flange exerting pressure against said annular seating surface and against the face of said stud flange which is directed away from said hole, and the said means connected to the outer end of the stud includes a cylinder head which is in engagement with the liner and a nut threadly attached to the stud and urging the cylinder head against the liner toward the base.

6. A connection according to claim 5 which includes a compressible gasket situated between said flange of the cylinder liner and the seating surface of the base, said gasket overlying the said stud flange at least in part.

* * * * *